(12) United States Patent
Komatsu et al.

(10) Patent No.: US 12,253,142 B2
(45) Date of Patent: Mar. 18, 2025

(54) TOROIDAL CONTINUOUSLY VARIABLE TRANSMISSION

(71) Applicant: KAWASAKI JUKOGYO KABUSHIKI KAISHA, Kobe (JP)

(72) Inventors: Kenji Komatsu, Kobe (JP); Hideyuki Imai, Kobe (JP); Kazuhiko Irie, Akashi (JP); Toru Aibe, Kobe (JP); Keigo Maehata, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 18/034,755

(22) PCT Filed: Nov. 5, 2021

(86) PCT No.: PCT/JP2021/040779
§ 371 (c)(1),
(2) Date: May 1, 2023

(87) PCT Pub. No.: WO2022/137831
PCT Pub. Date: Jun. 30, 2022

(65) Prior Publication Data
US 2023/0407950 A1    Dec. 21, 2023

(30) Foreign Application Priority Data
Dec. 23, 2020  (JP) .................................. 2020-213591

(51) Int. Cl.
*F16H 15/38*    (2006.01)
*B64D 41/00*    (2006.01)

(52) U.S. Cl.
CPC ............. *F16H 15/38* (2013.01); *B64D 41/00* (2013.01)

(58) Field of Classification Search
CPC ............................... F16H 15/38; B64D 41/00
See application file for complete search history.

(56) References Cited

U.S. PATENT DOCUMENTS 1,865,102 A * 6/1932 Hayes ..................... F16H 15/38
                                                                 475/192
2,057,136 A   10/1936 Criswell
(Continued)

FOREIGN PATENT DOCUMENTS

| GB | 214634 A | * | 7/1924 |
| JP | 2001-158400 A | | 6/2001 |
| JP | 2014-228069 A | | 12/2014 |

OTHER PUBLICATIONS

International Search Report of PCT/JP2021/040779 dated Dec. 14, 2021 [PCT/ISA/210].
(Continued)

*Primary Examiner* — William C Joyce
(74) *Attorney, Agent, or Firm* — Sughrue Mion, PLLC

(57) ABSTRACT

A toroidal continuously variable transmission including at least one containment body covering a target disc that is at least one of an input disc and an output disc. The containment body includes a ring that covers an outer peripheral surface of the target disc so as to be spaced apart from the outer peripheral surface of the target disc in a radial direction. A maximum dimension of the ring in an axial direction is larger than a maximum dimension of the outer peripheral surface of the target disc in the axial direction.

3 Claims, 11 Drawing Sheets

(56) References Cited

U.S. PATENT DOCUMENTS

| | | | | |
|---|---|---|---|---|
| 2,123,008 A | * | 7/1938 | Hayes | F16H 15/38 |
| | | | | 476/41 |
| 2,157,259 A | * | 5/1939 | Delaval-Crow | F16H 15/38 |
| | | | | 476/41 |
| 3,299,744 A | * | 1/1967 | Kraus | F16H 15/38 |
| | | | | 475/26 |
| 3,802,284 A | * | 4/1974 | Sharpe | F16H 15/38 |
| | | | | 476/42 |
| 7,166,055 B2 | * | 1/2007 | Taketsuna | F16H 61/6649 |
| | | | | 476/40 |
| 10,415,690 B2 | * | 9/2019 | Tanaka | F16H 15/38 |
| 2001/0003108 A1 | | 6/2001 | Goi et al. | |

OTHER PUBLICATIONS

Extended European Search Report dated Oct. 23, 2024, issued in European Application No. 21909985.0.

* cited by examiner

TOROIDAL CONTINUOUSLY VARIABLE TRANSMISSION

CROSS REFERENCE TO RELATED APPLICATIONS

This application is a National Stage of International Application No. PCT/JP2021/040779 filed on Nov. 5, 2021, claiming priority based on Japanese Patent Application No. 2020-213591 filed on Dec. 23, 2020.

TECHNICAL FIELD

The present disclosure relates to a toroidal continuously variable transmission.

BACKGROUND ART

A toroidal continuously variable transmission that performs speed change by tilting a power roller located between an input disc and an output disc has been known (see PTL 1, for example).

CITATION LIST

Patent Literature

PTL 1: Japanese Laid-Open Patent Application Publication No. 2001-158400

SUMMARY OF INVENTION

Technical Problem

If the disc breaks during the operation of the toroidal continuously variable transmission, fragments of the disc collide with a housing by centrifugal force. However, if the thickness of the housing is increased or the design of the housing is changed in order to satisfy containment performance necessary to contain respective parts in the housing, the weight and manufacturing cost of the housing increase.

An object of the present disclosure is to compensate containment performance of a housing without increasing the thickness of the housing and changing the design of the housing.

Solution to Problem

A toroidal continuously variable transmission according to one aspect of the present disclosure includes: an input disc including a speed change surface; an output disc including a speed change surface; a power roller located between the speed change surface of the input disc and the speed change surface of the output disc so as to be tiltable; at least one containment body covering a target disc that is at least one of the input disc and the output disc; and a housing that houses the input disc, the output disc, the power roller, and the containment body. The containment body includes a ring that covers an outer peripheral surface of the target disc so as to be spaced apart from the outer peripheral surface of the target disc in a radial direction. A maximum dimension of the ring in an axial direction is larger than a maximum dimension of the outer peripheral surface of the target disc in the axial direction.

According to the above configuration, when the disc breaks during the operation of the toroidal continuously variable transmission, and disc fragments on which centrifugal force acts try to fly out in a direction perpendicular to the axial direction, the disc fragments are prevented from directly colliding with the housing by the ring of the containment body. Then, the maximum dimension of the ring in the axial direction is larger than the maximum dimension of the outer peripheral surface of the disc in the axial direction. Therefore, not only when the disc fragments try to fly out in a direction perpendicular to the axial direction but also when the disc fragments try to fly out in a direction oblique to the axial direction, the disc fragments can be prevented from directly colliding with the housing by the ring within a range of the maximum dimension of the ring in the axial direction. On this account, the containment performance of the housing can be compensated.

Advantageous Effects of Invention

According to one aspect of the present disclosure, containment performance of a housing can be compensated without increasing the thickness of the housing and changing the design of the housing.

DESCRIPTION OF EMBODIMENTS

Hereinafter, an embodiment will be described with reference to the drawings.

Figure 1:
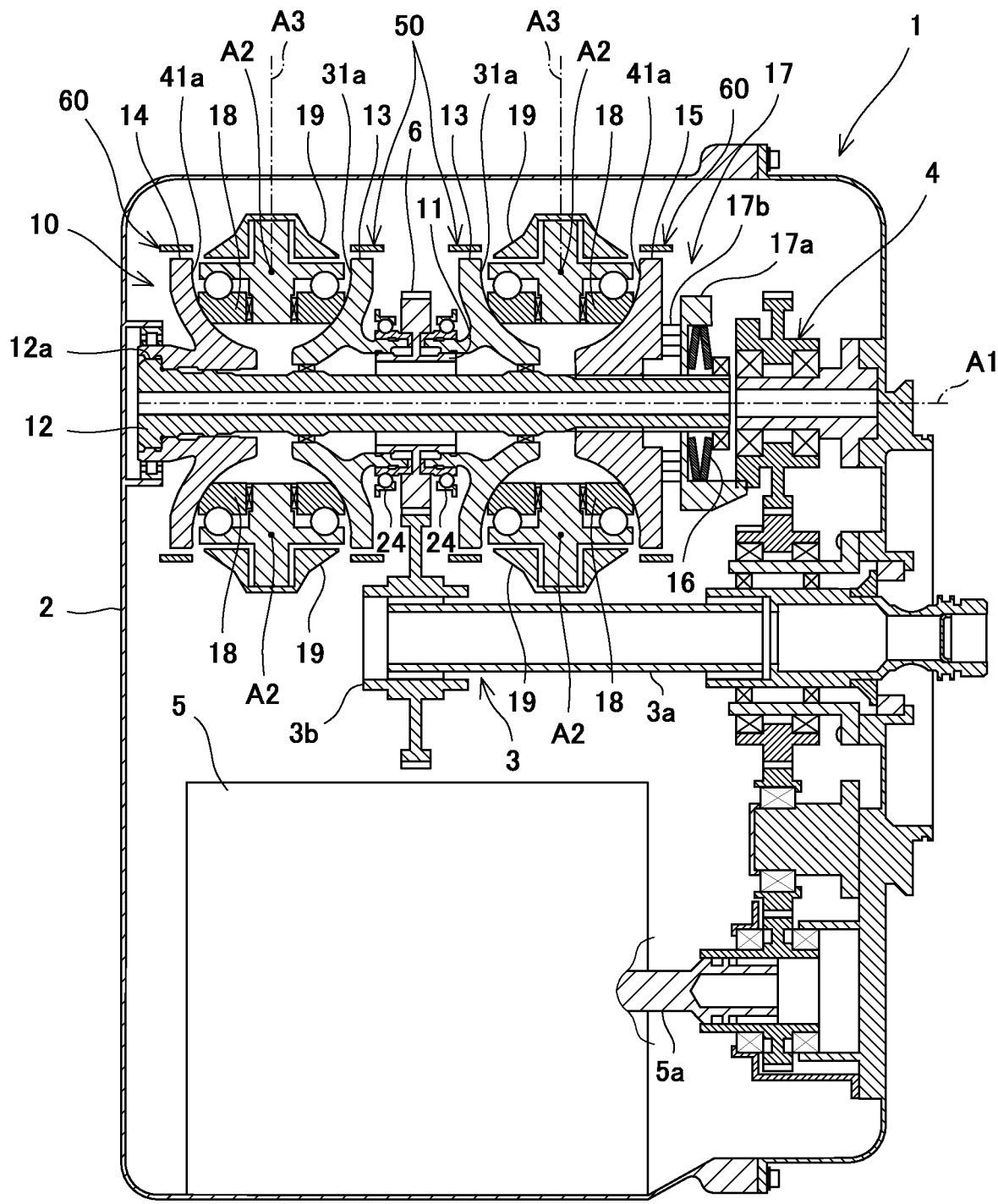
FIG. 1 is a sectional view showing a drive mechanism-integrated electric power generating apparatus including a toroidal continuously variable transmission according to an embodiment.
Figure 2:
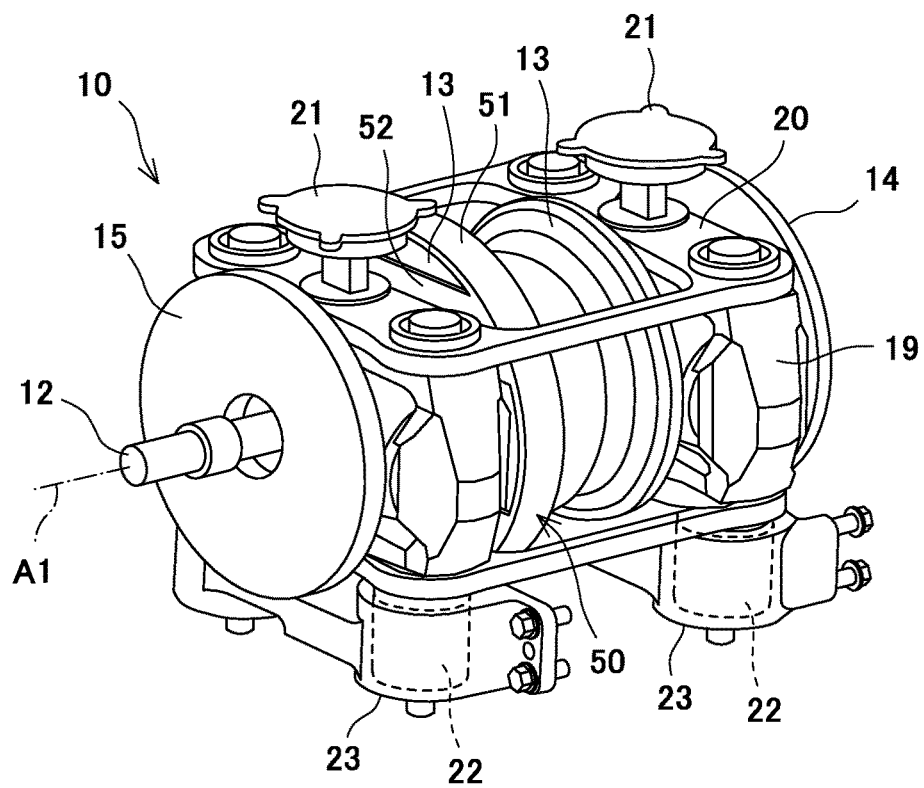
FIG. 2 is a perspective view showing the toroidal continuously variable transmission of FIG. 1.
Figure 3:
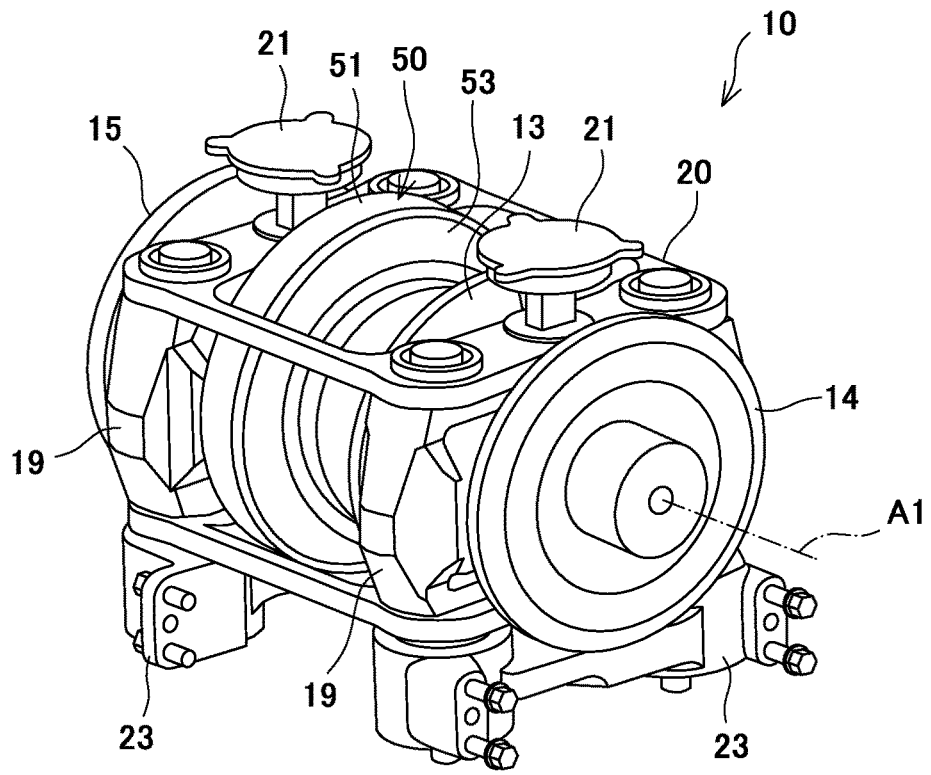
FIG. 3 is a perspective view showing the toroidal continuously variable transmission of FIG. 1 from a different point of view.
Figure 4:
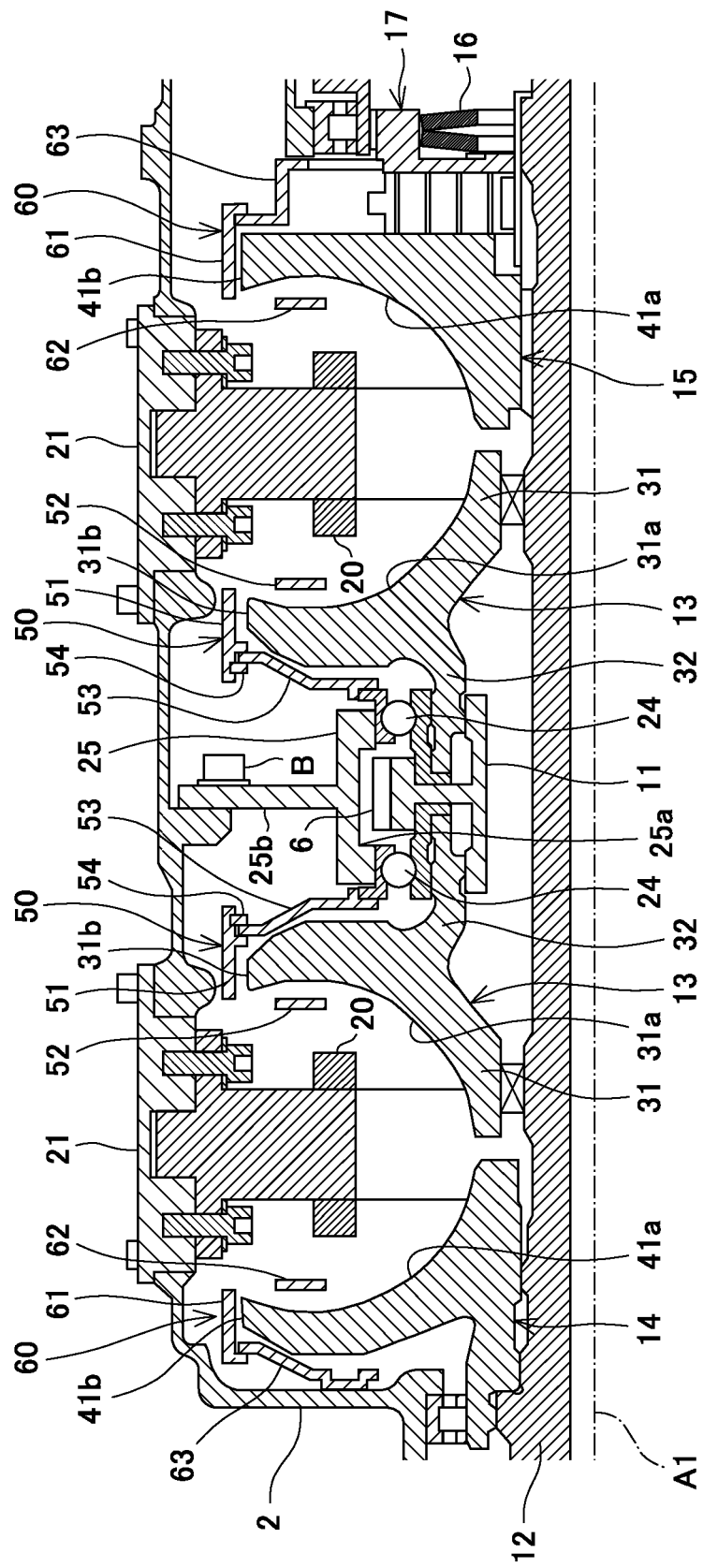
FIG. 4 is a sectional view showing the toroidal continuously variable transmission of FIG. 2.

FIG. 1 is a sectional view of a drive mechanism-integrated electric power generating apparatus 1 including a toroidal continuously variable transmission 10 according to the embodiment. FIG. 2 is a perspective view showing the toroidal continuously variable transmission 10 of FIG. 1. FIG. 3 is a perspective view showing the toroidal continuously variable transmission 10 of FIG. 1 from a different point of view. FIG. 4 is a sectional view showing the toroidal continuously variable transmission 10 of FIG. 2. FIG. 4 is a sectional view of a phase around an axis A1 where power rollers 18 and trunnions 19 do not exist, i.e., a sectional view of the phase that is different from a phase of FIG. 1 by 90°. Moreover, in FIGS. 2 and 3, only one first containment body 50 corresponding to one input disc 13 is shown, and the other first containment body 50 corresponding to the other the input disc 13 and second containment bodies 60 corresponding to output discs 14 and 15 are not shown.

As shown in FIG. 1, the drive mechanism-integrated electric power generating apparatus 1 (Integrated Drive Generator) is used for an AC power supply of an aircraft and includes a housing 2 attached to an engine of the aircraft. The housing 2 houses an input mechanism 3, the toroidal continuously variable transmission 10 (hereinafter referred to as a "transmission"), a power transmission mechanism 4, and a power generator 5. The housing 2 is made of, for example, a metal material but may be made of fiber-reinforced resin. The transmission 10 does not have to be a part of the drive mechanism-integrated electric power generating apparatus and may be used for applications other than aircrafts.

The transmission 10 includes a transmission input shaft 11 and a transmission output shaft 12 (rotating shaft) which are coaxially located and relatively rotatable. The transmission input shaft 11 is connected to an engine rotating shaft through the input mechanism 3. The input mechanism 3 includes a device input shaft 3a and a gear 3b. Rotational power from the engine rotating shaft is input to the device input shaft 3a, and the gear 3b rotates integrally with the device input shaft 3a. An input gear 6 that rotates integrally with the transmission input shaft 11 is located at the transmission input shaft 11. The transmission output shaft 12 is connected to a power generator input shaft 5a of the power generator 5 through the power transmission mechanism 4 (for example, a gear train).

The rotational power taken out from the engine rotating shaft is input to the transmission input shaft 11 through the input mechanism 3, and the rotational power of the transmission input shaft 11 is transmitted to the input discs 13. The transmission 10 changes the speed of the rotation of the transmission input shaft 11 and outputs the rotation to the transmission output shaft 12. The rotational power of the transmission output shaft 12 is transmitted to the power generator input shaft 5a through the power transmission mechanism 4. When the power generator input shaft 5a is rotated, the power generator 5 generates AC power. Regardless of a change in a rotational speed of the engine rotating shaft, a change gear ratio of the transmission 10 is continuously changed such that the rotational speed of the power generator input shaft 5a is maintained at an appropriate value (for example, a value corresponding to a frequency appropriate for the operation of an electric component of the aircraft).

As shown in FIGS. 1 to 4, the transmission 10 is of, for example, a half toroidal type and a double cavity type and includes the input discs 13 and the output discs 14 and 15 which form two pairs. The input discs 13 are fitted to the transmission input shaft 11 so as to rotate integrally with the transmission input shaft 11. The output discs 14 and 15 are fitted to the transmission output shaft 12 so as to rotate integrally with the transmission output shaft 12. The discs 13 to 15 that form two pairs are located adjacent to each other in a direction along the axis A1 so as to rotate about the axis A1. The input discs 13 and the output discs 14 and 15 are located so as to be opposed to each other in the direction along the axis A1 of the transmission 10.

The input discs 13 include respective concave speed change surfaces 31a opposed to each other. The output discs 14 and 15 include respective concave speed change surfaces 41a opposed to each other. The input discs 13 and the output discs 14 and 15 form annular cavities around the axis A1 by the speed change surfaces 31a and 41a. The type of the transmission is not limited to the double cavity type and may be a single cavity type.

The transmission 10 is of, for example, a middle input type. The transmission output shaft 12 is inserted into the transmission input shaft 11 and projects from the transmission input shaft 11 toward both sides. A pair of input discs 13 are middle discs located back to back on the transmission input shaft 11. The input gear 3b that rotates integrally with the transmission input shaft 11 is located between the pair of input discs 13. A pair of output discs 14 and 15 are outside discs located outside the pair of input discs 13 in the direction along the axis A1. The output discs 14 and 15 are connected to the power transmission mechanism 4 so as to transmit the rotational power to the power transmission mechanism 4 through a press 17.

The output disc 14 is prevented from being displaced outward along the axis A1 by a convex portion 12a, projecting in a radial direction, of the transmission output shaft 12. The output disc 15 is biased by a preload spring 16 toward the input disc 13. When the transmission 10 is rotated, the output disc 15 is biased by the press 17 toward the input disc 13. The press 17 moves the output discs 14 and 15 in the direction along the axis A1 between a closest position where the input discs 13 and the output discs 14 and 15 are located closest to each other in the direction along the axis A1 and a farthest position where the input discs 13 and the output discs 14 and 15 are located farthest from each other in the direction along the axis A1. The closest position may be referred to as a first position, and the farthest position may be referred to as a second position.

The press 17 is, for example, a loading cam. The press 17 includes a cam plate 17a and a cam roller 17b. The cam plate 17a is biased by the preload spring 16 toward the output disc 15. The cam roller 17b is located between the output disc 15 and the cam plate 17a. A surface (back surface) of the output disc 15 on which the cam roller 17b slides and a surface of the cam plate 17a on which the cam roller 17b slides are, for example, non-planar cam surfaces.

When the transmission 10 is rotated, force by which the output disc 15 and the cam plate 17 separate from each other in the direction along the axis A1 is generated by a cam action of the press 17. When the cam plate 17a separates from the output disc 15, the cam plate 17a pushes one end portion of the transmission output shaft 12 to displace the transmission output shaft 12 toward the power transmission mechanism 4 in the direction along the axis A1. In accordance with this, the other end portion of the transmission output shaft 12 pushes the output disc 14 toward the input disc 13. To be specific, when the transmission 10 is rotated, the input discs 13 are not displaced in the direction along the axis A1, and the output discs 14 and 15 are displaced in the direction along the axis A1 so as to approach the input discs 13.

The transmission 10 includes: the power rollers 18 located in the cavities; and the trunnions 19 which support the power rollers 18 such that the power rollers 18 are tiltable. The trunnions 19 are supported by the housing 2 so as to be tiltable about an axis A2 and displaceable in a direction along the axis A2. The axis A2 and the axis A1 are skew lines. The power roller 18 is supported by the trunnion 19 so as to be rotatable about an axis A3 perpendicular to the the axis A2.

The power roller 18 is located in a predetermined phase region around the axis A1. Two power rollers 18 are located at a pair of discs that are the input disc and the output disc (i.e., a pair of discs that are the input disc 13 and the output disc 14 or a pair of discs that are the input disc 13 and the output disc 15). The trunnion 19 is connected to a linear-motion actuator 22, and the actuator 22 makes the trunnion 19 reciprocate in the direction along the axis A2 together with the power roller 18. The actuator 22 is, for example, a hydraulic actuator (hydraulic cylinder).

When the input discs 13 are rotated, the output discs 14 and 15 are rotated through the power rollers 18, and thus, the transmission output shaft 12 is rotated. When the trunnion 19 and the power roller 18 are displaced in the direction along the the axis A2, a tilt angle of the power roller 18 around the axis A2 is changed, and thus, the change gear ratio of the transmission 10 is continuously changed in accordance with the tilt angle.

The power roller 18 is located between the speed change surface 31a of the input disc 13 and the speed change surface 41a of the output disc 14 or 15 so as to be tiltable about the axis A2. The power roller 18 changes the speed of the rotational power of the input disc 13 at the change gear ratio corresponding to the tilt angle and then transmits the rotational power to the output disc 14 or 15. When the rotational torque of the output disc 14 increases, the output disc 15 is pushed by the press 17 so as to approach the input disc 13, and this increases pressure by which the input disc 13 and the output disc 14 sandwich the power roller 18 and pressure by which the input disc 13 and the output disc 15 sandwich the power roller 18.

As shown in FIGS. 2 to 4, one end portion of the trunnion 19 is supported by a trunnion yoke 20 so as to be rotatable. The trunnion yoke 20 has, for example, a square frame shape. The trunnion yoke 20 is connected to the housing 2 by a yoke support 21. The other end portion of the trunnion 19 is connected to the actuator 22. The actuator 22 displaces the trunnion 19 in the direction along the tilting axis A2. The actuator 22 is supported by an actuator body 23. The actuator body 23 is fixed to the housing 2 by a fixture (for example, a bolt).

As shown in FIG. 4, the input disc 13 includes a disc main body portion 31 and a cylindrical portion 32. The disc main body portion 31 includes the speed change surface 31a opposed to the power roller 18. The cylindrical portion 32 projects from the disc main body portion 31 toward an opposite side of the power roller 18 along the axis A1. The disc main body portion 31 has a circular-arc section. The cylindrical portion 32 of the input disc 13 is supported by a bearing 24 so as to be rotatable, and the bearing 24 is supported by a bearing support 25 so as to be rotatable. The bearing support 25 is located behind the discs 13 to 15 and is fixed to the housing 2 by a fixture B (for example, a bolt). The bearing support 25 includes an opening through which part of the input gear 6 is exposed such that the input gear 6 meshes with the gear 3b.

The bearing support 25 includes an annular portion 25a and an arm portion 25b. The annular portion 25a is externally fitted to a pair of bearings 24 that are externally fitted to the cylindrical portions 32 of the pair of input discs 13. The arm portion 25b projects outward in the radial direction from the annular portion 25a. The arm portion 25b is fixed to the housing 2 by the fixture B. In FIG. 4, the annular portion 25a is shown as one piece but may be a combination of plural parts.

The transmission 10 includes a pair of first containment bodies 50 and a pair of second containment bodies 60. The first containment bodies 50 cover the pair of input discs 13, and the second containment bodies 60 cover the pair of output discs 14 and 15. Even if the discs 13 to 15 break during the operation of the transmission 10, the containment bodies 50 and 60 can prevent disc fragments, on which centrifugal force acts, from directly colliding with the housing.

Figure 5:
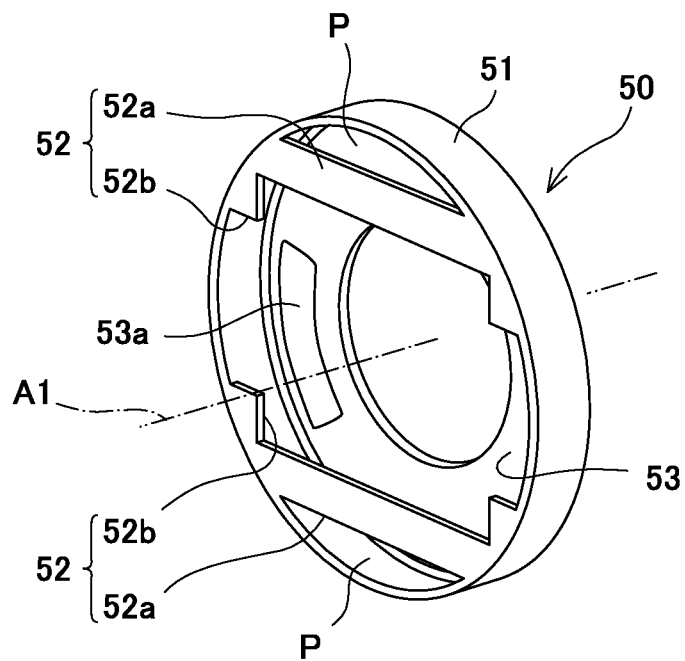
FIG. 5 is a perspective view showing a containment body of FIG. 4.
Figure 6:
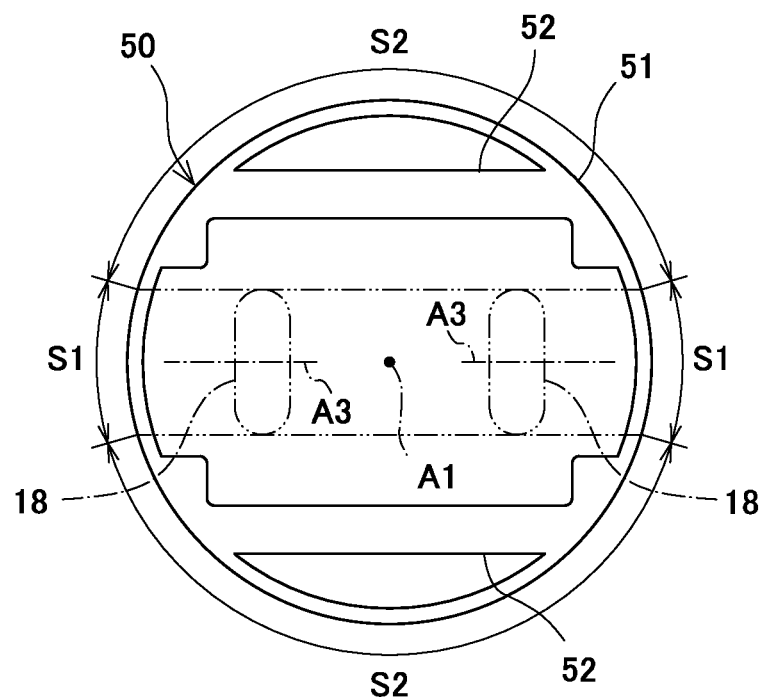
FIG. 6 is a front view showing the containment body of FIG. 5.

FIG. 5 is a perspective view showing the first containment body 50 of FIG. 4. FIG. 6 is a front view showing the first containment body 50 of FIG. 5. Since a basic structure of the first containment body 50 and a basic structure of the second containment body 60 are the same as each other, the basic structure of the first containment body 50 will be mainly described below. As shown in FIGS. 4 to 6, the first containment body 50 (second containment body 60) includes a ring 51 (ring 61) and may further include a guard 52 (guard 62) and a ring support 53 (ring support 63). The first containment body 50 is made of metal but may be made of resin (for example, fiber-reinforced resin), another material, or a combination thereof.

The ring 51 has a cylindrical shape including the axis A1 that coincides with a rotation axis of the input disc 13. The ring 51 covers an outer peripheral surface 31b of the input disc 13 so as to be spaced apart from the outer peripheral surface 31b in the radial direction. The dimension of a gap between an inner peripheral surface of the ring 51 and the outer peripheral surface 31b of the input disc 13 is, for example, 1 to 5 mm, preferably 1.2 to 3 mm, more preferably 1.3 to 2 mm.

The guard 52 is located at one side (side close to the power roller 18) of the ring 51 in the direction along the axis A1 and is integrally connected to the ring 51. The guard 52 may be separably connected to the ring 51. The guard 52 projects from the ring 51 toward a radially inner side. The guard 52 has, for example, a plate shape whose thickness direction is along the axis A1. The guard 52 includes, for example, a band plate portion 52a and projecting plate portions 52b but may include only the band plate portion 52a.

As shown in FIG. 5, the band plate portion 52a has a band plate shape extending in one direction and connects two different points on an outer circumference of the ring 51. An opening P is located between the band plate portion 52a and the ring 51. The opening P does not have to be located between the band plate portion 52a and the ring 51. The projecting plate portion 52b is a projection that projects from the ring 51 inward in the radial direction. A projection amount of the projecting plate portion 52b in the radial direction is, for example, a value within a range of 10% to 30% of a radius of the inner peripheral surface of the ring 51. The guard 52 may include only the band plate portion 52a or only the projecting plate portion 52b.

The ring supports 53 are located behind the respective discs 13 to 15. The ring support 53 is located between the ring 51 and the bearing support 25 (bearing 24) in the axial direction and connects the ring 51 and the bearing support 25 (bearing 24). The ring support 53 can be connected to one of the bearing support 25 and the bearing 24 or can be connected to both of the bearing support 25 and the bearing 24. The ring support 53 is separably connected to the ring 51 but may be integrally connected to the ring 51. The ring support 53 is, for example, an annular plate. The ring support 53 may include an oil-drain port 53a. In this case, the oil-drain port 53a can be partially located at the ring support 53 in a circumferential direction around the axis A1.

Various methods may be adopted as means for fixing the ring support 53 to the ring 51. For example, a fixing method using press fitting (for example, a retainer) or a fixing method using a fixture (for example, a bolt) may be adopted. The ring support 53 may be positioned and fixed to the ring 51 by a retainer 54 (see FIG. 4) while being internally fitted to the ring 51. The retainer 54 is, for example, an annular body.

As shown in FIG. 6, when the change gear ratio is "1" (i.e., equal speed), the power rollers 18 are located in a predetermined phase region around the axis A1 of the ring 51. The ring 51 includes: a first section S1 corresponding to the above phase region of the power rollers 18; and a second section S2 that is a region other than the above region. For example, a region of the ring 51 on which the power rollers 18 are projected in a direction along the axis A3 may be the first section S1, and a region other than the above region may be the second section S2.

The guard 52 is located in the second section S2 of the ring 51 but is not located in the first section S1 of the ring 51. The guard 52 is located in the second section S2. The guard 52 may be located in not only the second section S2 but also the first section S1 as long as the guard 52 does not limit the operations of the power rollers 18.

As shown in FIG. 4, the guard 52 is opposed to the speed change surface 31a of the input disc 13 so as to be spaced apart from the speed change surface 31a. Similarly, the guard 62 is opposed to the speed change surface 41a of the output disc 14 so as to be spaced apart from the speed change surface 41a. The ring support 53 is opposed to the back surface of the input disc 13 so as to be spaced apart from the back surface of the input disc 13. Similarly, the ring support 63 is opposed to the back surface of the output disc 14 or 15 so as to be spaced apart from the back surface of the output disc 14 or 15. Each of the ring supports 53 and 63 is connected to the housing 2 through a below-described supporting body. A minimum value of a gap between the guard 52 and the speed change surface 31a of the input disc 13 is, for example, 0.5 to 5 mm. A maximum value of the gap between the guard 52 and the speed change surface 31a of the input disc 13 is, for example, 1 to 8 mm. A minimum value of a gap between the guard 62 and the speed change surface 41a of the output disc 14 is, for example, 0.5 to 8 mm. A maximum value of the gap between the guard 62 and the speed change surface 41a of the output disc 14 is, for example, 1 to 11 mm.

A maximum dimension of the ring 51 of the first containment body 50 in the direction along the axis A1 is larger than a maximum dimension of the outer peripheral surface 31b of the input disc 13 in the direction along the axis A1. Similarly, a maximum dimension of the ring 61 of the second containment body 60 in the direction along the axis A1 is larger than a maximum dimension of an outer peripheral surface 41b of the output disc 14 or 15 in the direction along the axis A1. Each of the dimension of the outer peripheral surface 31b of the input disc 13 in the direction along the axis A1 and the dimensions of the outer peripheral surfaces 41b of the output discs 14 and 15 in the direction along the axis A1 is constant around the axis A1.

The first containment body 50 is supported by the supporting body connected to the housing 2. The first containment body 50 is connected to the housing 2 through the supporting body having a function (for example, a function of supporting the bearing 24) different from the function of supporting the first containment body 50. The supporting body may be, for example, the bearing support 25 connected to the housing 2, the below-described actuator body 23, or the like. The bearing support 25 is lined up with respect to the input disc 13 in the direction along the axis A1. The bearing 24, the ring support 53, and the ring 51 are connected to the bearing support 25. The first containment body 50 is not directly connected to the housing 2 but is indirectly connected to the housing 2 through the supporting body (bearing support 25). Similarly, the second containment body 60 may be indirectly connected to the housing 2 through the supporting body connected to the housing 2.

Figure 7A:
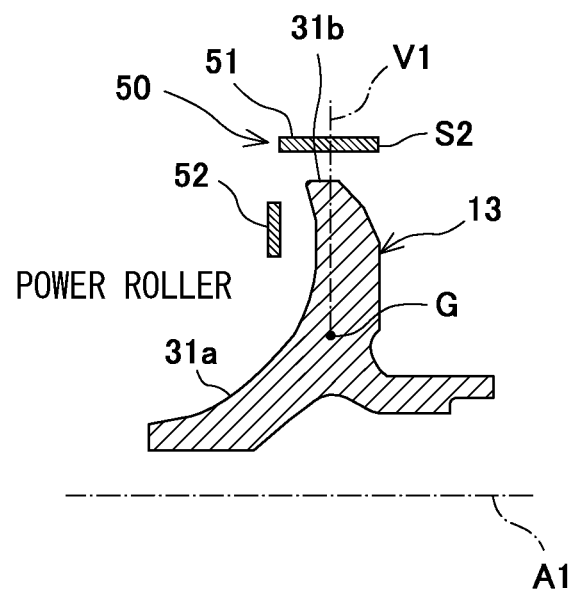
FIG. 7A is a sectional view showing a relation between an input disc and a second section of a ring of a first containment body of FIG. 2.
Figure 7B:
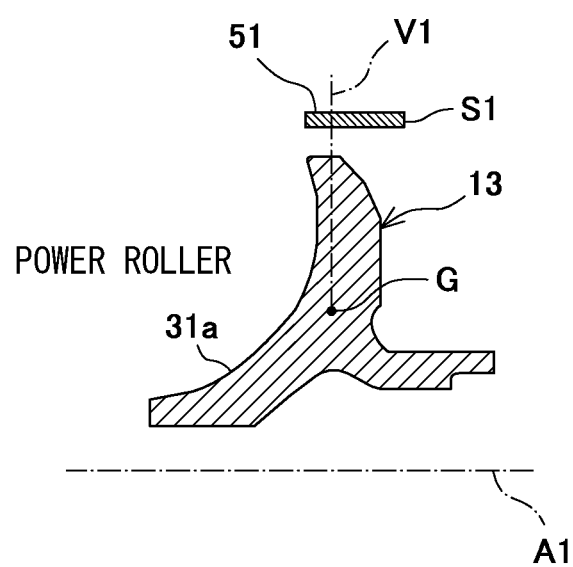
FIG. 7B is a sectional view showing a relation between the input disc and a first section of the ring of the first containment body of FIG. 2.

FIG. 7A is a sectional view showing a relation between the second section S2 of the ring 51 of the first containment body 50 of FIG. 2 and the input disc 13. FIG. 7B is a sectional view showing a relation between the first section S1 of the ring 51 of the first containment body 50 of FIG. 2 and the input disc 13. As shown in FIGS. 7A and 7B, the first containment body 50 is fixedly located, and the input disc 13 rotates about the axis A1 but is not displaced in the direction along the axis A1. To be specific, the first containment body 50 and the input disc 13 are not displaced relative to each other in the direction along the axis A1.

As shown in FIG. 7A, an end of the second section S2 of the ring 51 which is close to the power roller 18 in the direction along the axis A1 projects closer to the power roller 18 than an end of the outer peripheral surface 31b of the input disc 13 which is close to the power roller 18 in the direction along the axis A1. The end of the second section S2 of the ring 51 which is close to the power roller 18 in the direction along the axis A1 may be the same in position in the direction along the axis A1 as the end of the outer peripheral surface 31b of the input disc 13 which is close to the power roller 18 in the direction along the axis A1.

As shown in FIG. 7B, an end of the first section S1 of the ring 51 which is close to the power roller 18 in the direction along the axis A1 is the same in position in the direction along the axis A1 as the end of the outer peripheral surface 31b of the input disc 13 which is close to the power roller 18 in the direction along the axis A1. The end of the first section S1 of the ring 51 which is close to the power roller 18 in the direction along the axis A1 may project closer to the power roller 18 than the end of the outer peripheral surface 31b of the input disc 13 which is close to the power roller 18 in the direction along the axis A1. In FIGS. 7A and 7B, that the above ends are the same in position as each other includes a case where the above ends are substantially the same in position as each other.

The second section S2 of the ring 51 may or may not project beyond the first section S1 of the ring 51 in the direction along the axis A1 from the input disc 13 toward the power roller 18. To be specific, a maximum dimension of the second section S2 of the ring 51 in the direction along the axis A1 may be larger than or equal to a maximum dimension of the first section S1 of the ring 51 in the direction along the axis A1. The ring 51 may be located in a range including a gravity center position G of the input disc 13 in the direction along the axis A1. In this case, a virtual line V1 extending in the radial direction (direction orthogonal to the axis A1) through the gravity center position G of the input disc 13 intersects with the ring 51.

Figure 8A:
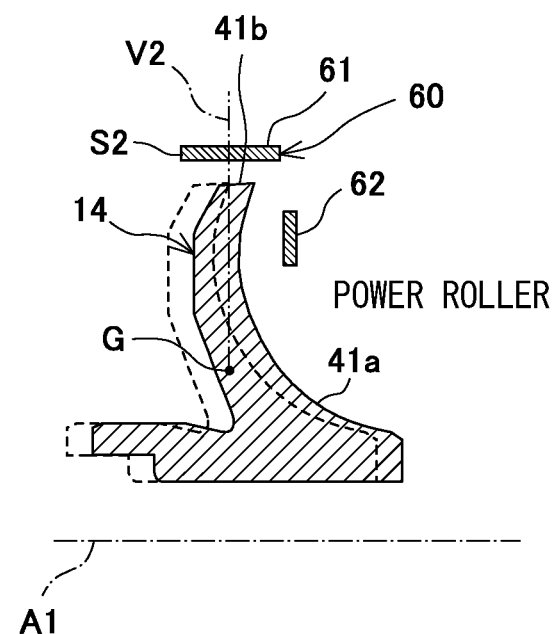
FIG. 8A is a sectional view showing a relation between an output disc and a second section of a ring of a second containment body of FIG. 2.
Figure 8B:
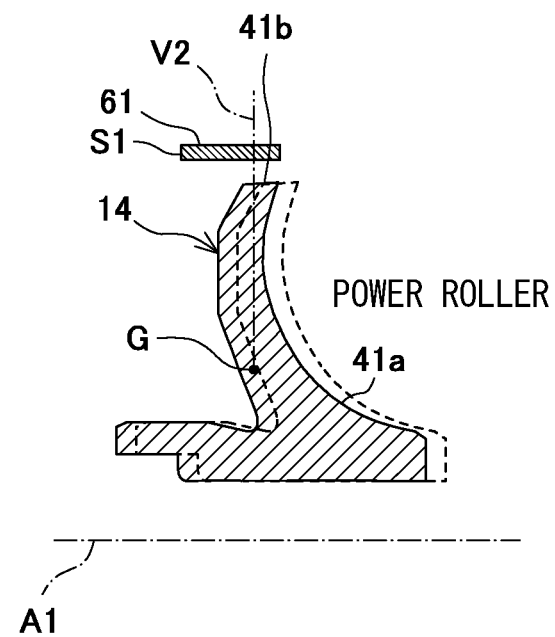
FIG. 8B is a sectional view showing a relation between the output disc and a first section of the ring of the second containment body of FIG. 2.

FIG. 8A is a sectional view showing a relation between the second section S2 of the ring 61 of the second containment body 60 of FIG. 2 and the output disc 14. FIG. 8B is a sectional view showing a relation between the first section S1 of the ring 61 of the second containment body 60 of FIG. 2 and the output disc 14. As shown in FIGS. 8A and 8B, the second containment body 60 is fixedly located, but the output disc 14 is displaceable in the direction along the axis A1 by pressing force of the press 17 (see FIG. 4). The output disc 14 may move in the direction along the axis A1 between the closest position where the output disc 14 is located closest to the input disc 13 in the direction along the axis A1 and the farthest position where the output disc 14 is located farthest from the input disc 13 in the direction along the axis A1.

To be specific, the second containment body 60 and the output disc 14 are displaced relative to each other in the direction along the axis A1. In FIG. 8A, the output disc 14 at the closest position is shown by a solid line, and the output disc 14 at the farthest position is shown by a broken line. In FIG. 8B, the output disc 14 at the farthest position is shown by a solid line, and the output disc 14 at the closest position is shown by a broken line. Since the output disc 14 and the output disc 15 are similar to each other, the following will mainly describe the output disc 14.

As shown in FIG. 8A, when the output disc 14 is located at the closest position (shown by the solid line in FIG. 8A), an end of the second section S2 of the ring 61 of the second containment body 60 which is close to the power roller 18 in the direction along the axis A1 may project closer to the power roller 18 than an end of the outer peripheral surface 41b of the output disc 14 which is close to the power roller 18 in the direction along the axis A1. When the output disc 14 is located at the closest position, the end of the second section S2 of the ring 61 which is close to the power roller 18 in the direction along the axis A1 may be the same in position in the direction along the axis A1 as the end of the outer peripheral surface 41b of the output disc 14 which is close to the power roller 18 in the direction along the axis A1.

As shown in FIG. 8B, when the output disc 14 is located at the farthest position (shown by the solid line in FIG. 8B), an end of the first section S1 of the ring 61 which is close to the power roller 18 in the direction along the axis A1 is the same in position in the direction along the axis A1 as an end of the outer peripheral surface 41b of the output disc 14 which is close to the power roller 18 in the direction along the axis A1. When the output disc 14 is located at the farthest position, the end of the first section S1 of the ring 61 which is close to the power roller 18 in the direction along the axis A1 may project closer to the power roller 18 than the end of the outer peripheral surface 41b of the output disc 14 which is close to the power roller 18 in the direction along the axis A1. In FIGS. 8A and 8B, that the above ends are the same in position as each other includes a case where the above ends are substantially the same in position as each other.

As shown in FIGS. 8A and 8B, the second section S2 of the ring 61 projects beyond the first section S1 of the ring 61 in the direction along the axis A1 from the output disc 14 toward the power roller 18. When the output disc 14 is displaced in the direction along the axis A1, the ring 61 may be located in a range including the gravity center position G of the output disc 14 in the direction along the axis A1. In this case, a virtual line V2 extending in the radial direction (direction orthogonal to the axis A1) through the gravity center position G of the output disc 14 intersects with the ring 61.

The dimensions of the first sections S1 of the rings 51 and 61 in the direction along the axis A1 and the dimensions of the second sections S2 of the rings 51 and 61 in the direction along the axis A1 are larger than the dimensions of the outer peripheral surfaces 31b and 41b of the corresponding discs 13 and 14 in the direction along the axis A1.

Figure 9:
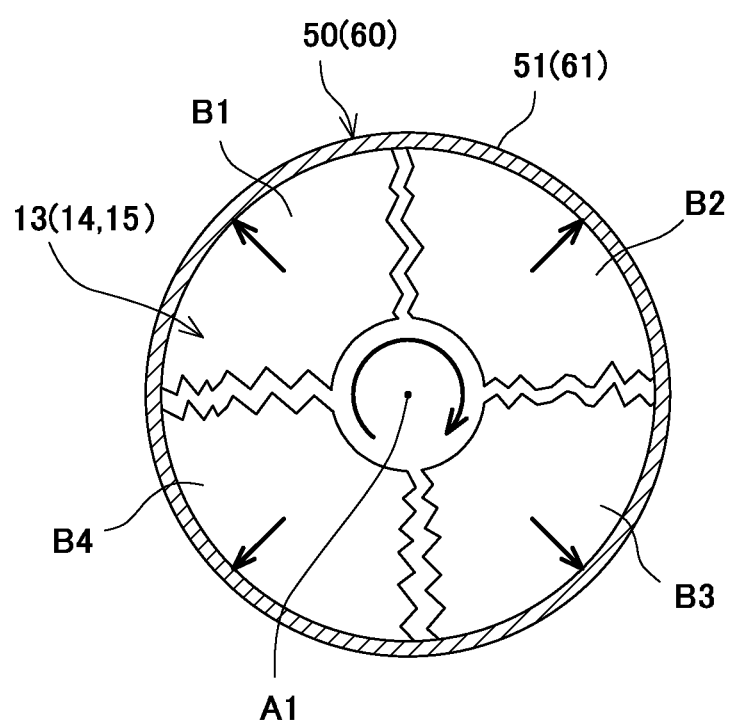
FIG. 9 is a schematic diagram for explaining a containment function of the containment body of FIG. 5 when the disc breaks.

According to the above-described configuration, the following effects are achieved. As shown in FIG. 9, if the input disc 13 (or the output disc 14 or 15) breaks while the transmission 10 is rotating, disc fragments B1 to B4 try to fly outward in the radial direction by centrifugal force while moving around the axis A1 by rotary inertia. However, the disc fragments B1 to B4 are prevented from directly colliding with the housing 2 by the ring 51 of the first containment body 50 within a range of the maximum dimension of the ring in the axial direction. Moreover, although not shown, when the guard 52 (see FIG. 5) is located at the ring 51, the disc fragments B1 to B4 which try to fly out in not only a direction perpendicular to the direction along the axis A1 but also a direction oblique to the direction along the axis A1 can be prevented from directly colliding with the housing 2 by the guard 52 of the first containment body 50. Therefore, the containment performance of the housing 2 can be compensated without increasing the thickness of the housing 2 and changing the design of the housing 2.

The gap between the input disc 13 (or the output disc 14 or 15) and the ring 51 can be set to be small. Therefore, when the disc fragments B1 to B4 on which the centrifugal force acts collide with the ring 51, the acceleration of the disc fragments B1 to B4 in the radial direction can be made low, and collision angles of the disc fragments B1 to B4 to the ring 51 can be made small. With this, an impact load generated at the ring 51 can be made low.

Moreover, even when the disc fragments B1 to B4 are displaced in the direction along the axis A1, the disc fragments B1 to B4 can be prevented from directly colliding with the housing 2 by the ring 51 and the guard 52 (see FIG. 1).

The maximum dimension of the ring 51 in the direction along the axis A1 is larger than the maximum dimension of the outer peripheral surface 31b of the disc 13 in the direction along the axis A1 (see FIG. 4). Therefore, even when the disc fragments B1 to B4 are displaced in the direction along the axis A1 and try to fly out in not only the direction perpendicular to the direction along the axis A1 but also the direction oblique to the direction along the axis A1, the disc fragments B1 to B4 can be prevented from directly colliding with the housing 2 by the ring 51. Regarding this principle of the containment, the same is true for the second containment body 60.

The ring 51 may be located in a range including the gravity center position G of the input disc 13 in the direction along the axis A1, and the ring 61 may be located in a range including the gravity center position G of the output disc 14 or 15 in the direction along the axis A1. In this case, the disc fragments B1 to B4 on which the centrifugal force acts can be prevented from directly colliding with the housing 2 by the rings 51 and 61.

The second section S2 of the ring 51 may project beyond the first section S1 of the ring 51 in the direction along the axis A1 from the disc 13 toward the power roller 18, and the second section S2 of the ring 61 may project beyond the first section S1 of the ring 61 in the direction along the axis A1 from the disc 14 or 15 toward the power roller 18. In this case, the disc fragments B1 to B4 can be prevented from directly colliding with the housing 2 by the rings 51 and 61 while preventing the rings 51 and 61 from limiting tilting ranges of the power rollers 18 (and the trunnions 19).

As shown in FIGS. 7A, 7B, 8A, and 8B, the relative position between the outer peripheral surface 31a of the disc 13 and the first section S1 of the ring 51 in the direction along the axis A1, the relative position between the outer peripheral surface 31a of the disc 13 and the second section S2 of the ring 51 in the direction along the axis A1, the relative position between the outer peripheral surface 41a of the disc 14 or 15 and the first section S1 of the ring 61 in the direction along the axis A1, and the relative position between the outer peripheral surface 41a of the disc 14 or 15 and the second section S2 of the ring 61 in the direction along the axis A1 can be set as described above. Therefore, the disc fragments B1 to B4 can be prevented from directly colliding with the housing 2 by the rings 51 and 61 while preventing the rings 51 and 61 from limiting movable ranges of the power rollers 18.

The containment body 50 is connected to the bearing support 25 connected to the housing 2. Therefore, another part (bearing support 25) is interposed between the containment body 50 and the housing 2. With this, the impact load transmitted from the containment body to the housing 2 is reduced, and the containment performance of the housing 2 can be compensated. At this time, a component, having another function (for example, the bearing support 25 is originally a part that supports the bearing 24), of the toroidal continuously variable transmission is used as the part interposed between the containment body 50 and the housing 2. Therefore, the number of parts can be prevented from increasing.

When the containment body 50 includes the guard 52, and the containment body 60 includes the guard 62, the disc fragments B1 to B4 can be prevented from flying out by the guards 52 and 62. Moreover, when the guard 52 is integrated with the ring 51, and the guard 62 is integrated with the ring 61, the rigidity of the rings 51 and 61 can be increased without increasing the number of parts of the rings 51 and 61.

When the ring support 53 is integrated with the ring 51, and the ring support 63 is integrated with the ring 61, the rigidity of the rings 51 and 61 can be increased without increasing the number of parts of the rings 51 and 61.

Each of the ring supports 53 and 63 may include the oil-drain port 53a that is open outward in the radial direction. In this case, the oil having entered into a space surrounded by the ring 51 and the ring support 53 can be discharged through the oil-drain port 53a outward in the radial direction before being stirred by the disc 13, and the oil having entered into a space surrounded by the ring 61 and the ring support 63 can be discharged through the oil-drain port 53a outward in the radial direction before being stirred by the disc 14 or 15.

Figure 10A:
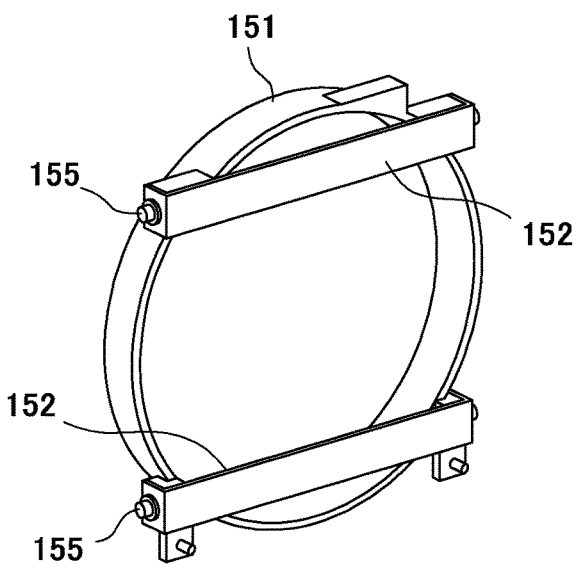
FIG. 10A is a perspective view of a first modified example of a guard of the containment body.

FIG. 10A is a perspective view of a first modified example of the guard of the containment body. As shown in FIG. 10A, a guard 152 of the first modified example is separable from a ring 151. The guard 152 is detachably fixed to the ring 151 by fixtures 155 (for example, bolts). With this, the guard 152 can be detached from the ring 151 when assembling the ring 151 to the transmission 10, and this improves the ease of work of the assembling.

Figure 10B:
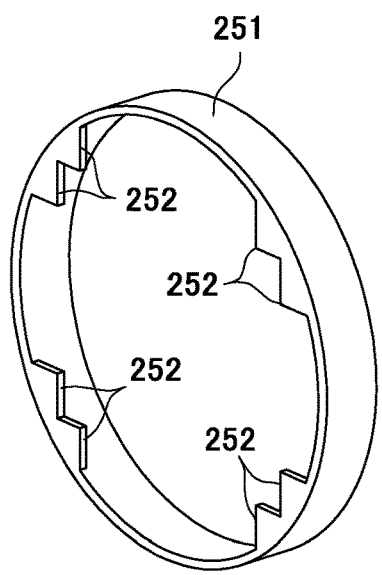
FIG. 10B is a perspective view of a second modified example of the guard of the containment body.
Figure 10C:
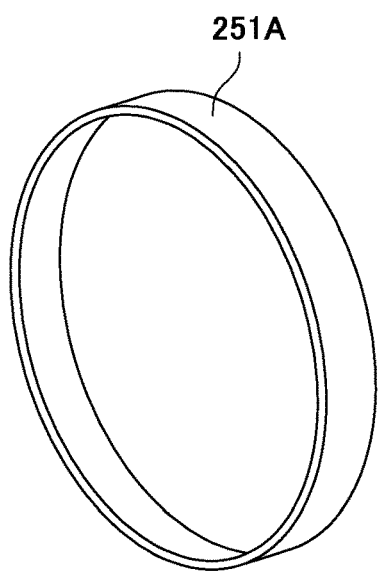
FIG. 10C is a perspective view of a third modified example of the containment body.

FIG. 10B is a perspective view of a second modified example of the guard of the containment body. As shown in FIG. 10B, a guard 252 of the second modified example is a projection projecting inward in the radial direction from a ring 251. A projection amount of the guard 252 in the radial direction is, for example, a value within a range of 10% to 30% of a radius of an inner peripheral surface of the ring 251. FIG. 10C is a perspective view of a third modified example of the containment body. As in the third modified example, a guard may not be located at a ring 251A in the containment body. According to FIG. 10C, the containment performance of the housing 2 can be compensated without increasing the number of parts of the containment body.

Figure 11A:
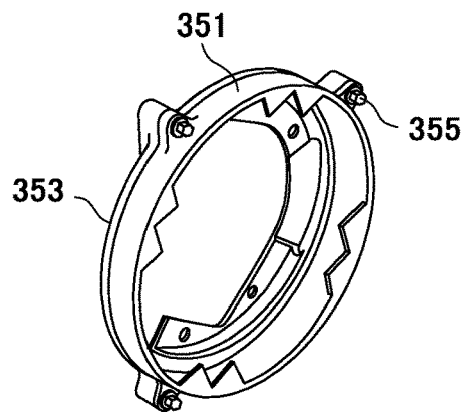
FIG. 11A is a perspective view of a first modified example of a connection structure between the ring and a ring support in the containment body.

FIG. 11A is a perspective view of a first modified example of a connection structure between the ring and the ring support in the containment body. In the connection structure of the first modified example, a ring support 353 is detachably fixed to a ring 351 by fixtures 355 (for example, bolts). With this, the ring support 353 can be detached from the ring 351 when assembling the ring 351 to the transmission 10, and this improves the ease of work of the assembling.

Figure 11B:
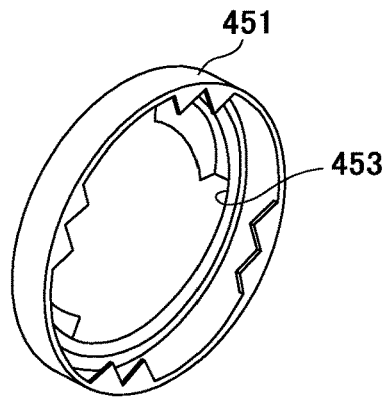
FIG. 11B is a perspective view of a second modified example of the connection structure between the ring and the ring support in the containment body.

FIG. 11B is a perspective view of a second modified example of the connection structure between the ring and the ring support in the containment body. In the connection structure of the second modified example, a ring support 453 and a ring 451 are formed as one piece. The ring support 453 and the bearing support 25 (see FIG. 4) may be separable from each other.

Figure 11C:
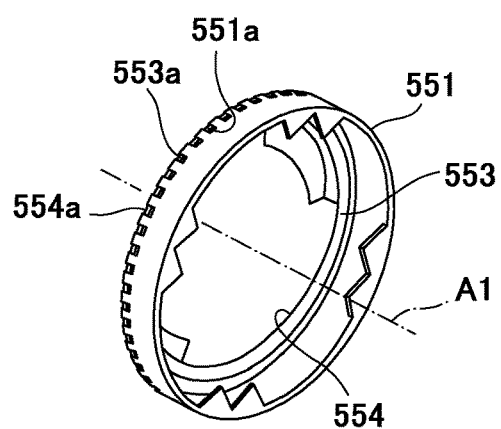
FIG. 11C is a perspective view of a third modified example of the connection structure between the ring and the ring support in the containment body.

FIG. 11C is a perspective view of a third modified example of the connection structure between the ring and the ring support in the containment body. In the connection structure of the third modified example, an end of a ring 551 in the direction along the axis A1 includes cutouts 551a that are lined up in the circumferential direction so as to be spaced apart from each other. An outer peripheral end of a ring support 553 includes projections 553a that are lined up in the circumferential direction so as to be spaced apart from each other. A dimension of the cutout 551a is larger in the direction along the axis A1 than a dimension of the projection 553a.

The ring support 553 is locked to the ring 551 by fitting the projections 553a to the cutouts 551a. Then, by attaching a retainer 554 to the ring 551, the ring support 553 is connected to the ring 551 by the retainer 554. The retainer 554 is annular, and an outer peripheral end of the retainer 554 includes projections 554a that are lined up in the circumferential direction so as to be spaced apart from each other. The projections 554a of the retainer 554 are fitted to the cutouts 551a of the ring 551 so as to press the projections 553a of the ring support 553 in the direction along the axis A1.

Figure 11D:
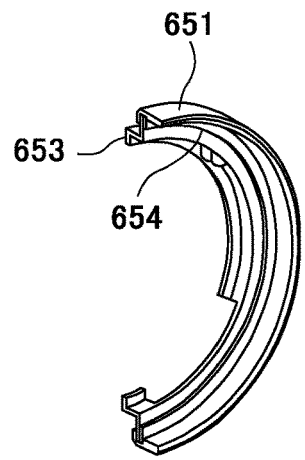
FIG. 11D is a perspective view of a fourth modified example of the connection structure between the ring and the ring support in the containment body.

FIG. 11D is a perspective view of a fourth modified example of the connection structure between the ring and the ring support in the containment body. In the connection structure of the fourth modified example, a ring support 653 and a retainer 654 are inserted into and fitted to a ring 651 from a side where the power roller 18 is located (see FIG. 4). The ring support 653 may be fixed to an adjacent member (for example, the bearing support 25) by a fixture (for example, a bolt) or by press fitting using the retainer 654.

Figure 12A:
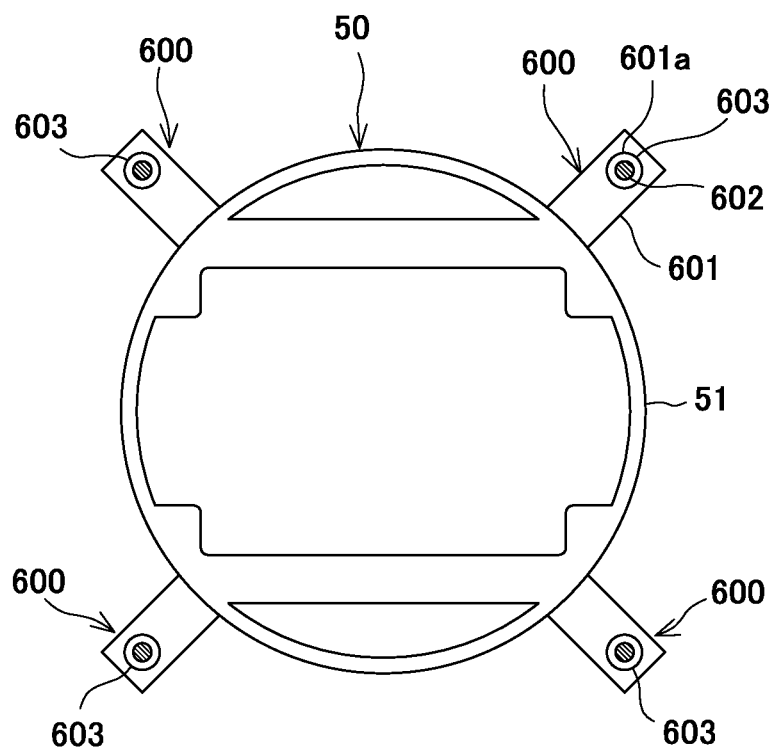
FIG. 12A is a front view of a first modified example of a support structure of the containment body.

FIG. 12A is a front view of a first modified example of a support structure of the containment body. As shown in FIG. 12A, the support structure of the first modified example includes a joint 600 that connects the containment body 50 to the housing 2 (see FIG. 1). The joint 600 includes a bracket 601 and a fixture 602 (for example, a bolt). The bracket 601 projects from the ring 51 of the containment body 50, and the fixture 602 fixes the bracket 601 to the housing 2.

The bracket 601 includes a fixing hole 601a into which the fixture 602 is inserted. The fixing hole 601a is a hole that is adequately larger in diameter than a portion of the fixture 602 which is located in the fixing hole 601a. For example, an inner diameter of the fixing hole 601a is 1.3 to 2.0 times larger than an outer diameter of the portion of the fixture 602 which is located in the fixing hole 601a.

When impact is generated at the containment body 50, the impact is transmitted to the bracket 601, and therefore, the bracket 601 may be displaced relative to the fixture 602 within a range of the fixing hole 601a. To be specific, the fixing hole 601a of the bracket 601 serves as an absorber 603 that allows the containment body 50 to be displaced by the impact. With this, the impact load transmitted from the containment body 50 to the housing 2 is reduced, and the containment performance of the housing 2 can be compensated.

Figure 12B:
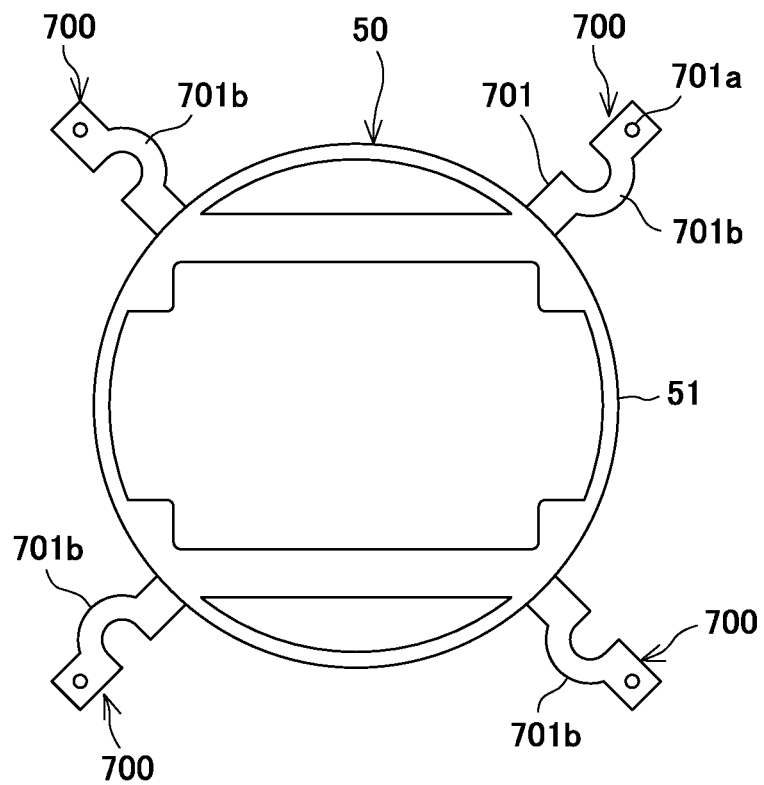
FIG. 12B is a front view of a second modified example of the support structure of the containment body.

FIG. 12B is a front view of a second modified example of the support structure of the containment body. As shown in FIG. 12B, the support structure of the second modified example includes a joint 700 that connects the containment body 50 to the housing 2. The joint 700 includes a bracket 701 and a fixture 702 (for example, a bolt). The bracket 701 projects from the ring 51 of the containment body 50. The fixture 702 fixes the bracket 701 to the housing 2.

The bracket 701 includes a fixing hole 701a and an absorber 701b. The fixture 702 is inserted into the fixing hole 701a. The absorber 701b has a detour shape that curves in a direction different from an extending direction (main direction of the bracket 701) of a straight line connecting a portion of the bracket 701 which is connected to the housing 2 and a portion of the bracket 701 which is connected to the containment body 50.

To be specific, the absorber 701b allows the bracket 701 to elastically extend or contract in the main direction. For example, the absorber 701b has an inverted U shape projecting in a direction orthogonal to the main direction of the bracket 701. When impact is generated at the containment body 50, the impact is transmitted to the bracket 701, and therefore, the absorber 701b may elastically deform. With this, the displacement of the containment body is allowed, and the impact load transmitted from the containment body 50 to the housing 2 is reduced. Therefore, the containment performance of the housing 2 can be compensated. The second modified example of the support structure of the containment body may be combined with the first modified example of the support structure of the containment body. For example, regarding four support portions of the containment body, the joints 600 may be used as two support portions, and the joints 700 may be used as the remaining two support portions.

Figure 13:
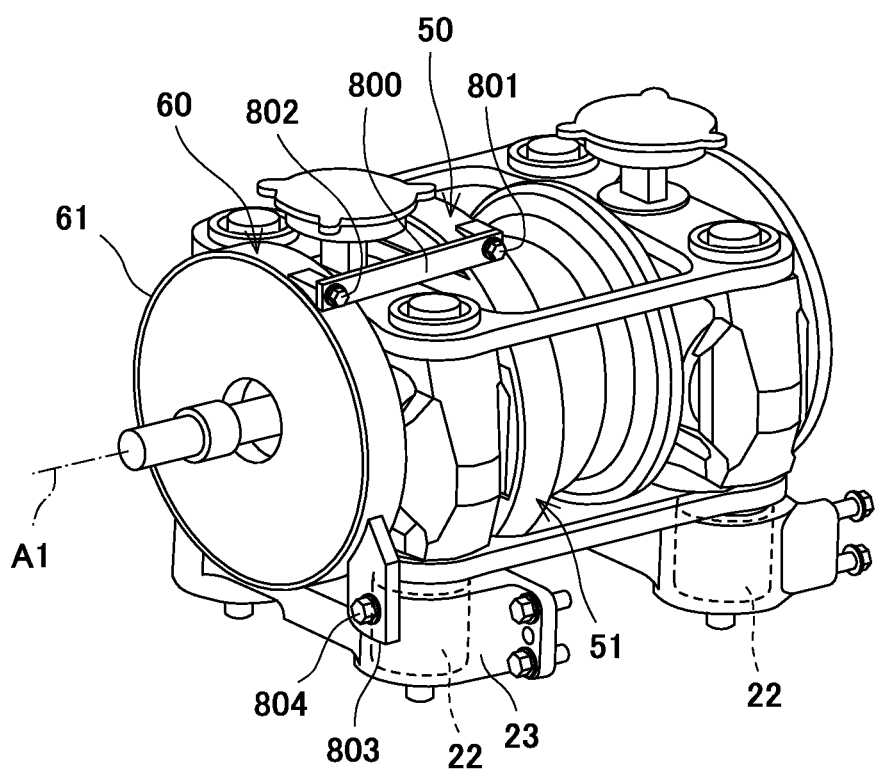
FIG. 13 is a perspective view of a third modified example of the support structure of the containment body.

FIG. 13 is a perspective view of a third modified example of the support structure of the containment body. As shown in FIG. 13, in the support structure of the third modified example, the first containment body 50 and the second containment body 60 are connected to each other by a coupling body 800. The coupling body 800 has, for example, a bar shape.

One end portion of the coupling body 800 is detachably fixed to the first containment body 50 (for example, the ring 51) by a fixture 801 (for example, a bolt). The other end portion of the coupling body 800 is detachably fixed to the second containment body by a fixture 802 (for example, a bolt).

As above, the coupling body 800 can support the first containment body 50 and the second containment body 60. FIG. 13 shows only one coupling body 800. However, it is preferable that the first containment body 50 and the second containment body 60 be connected to each other by the coupling bodies 800.

A bracket 803 is integrally connected to the second containment body 60 (for example, the ring 61). Moreover, the bracket 803 may be separably connected to the second containment body 60. The bracket 803 is fixed to the actuator body 23 by a fixture 804 (for example, a bolt). To be specific, the second containment body 60 is connected to the actuator 22 and the housing 2 through the bracket 803 and the actuator body 23 (supporting body). As above, since each of the containment bodies 50 and 60 is connected to a component, having another function, of the toroidal continuously variable transmission, the containment bodies 50 and 60 can be supported while preventing the number of parts from increasing.

The present disclosure is not limited to the above embodiment, and modifications, additions, and eliminations may be made with respect to the configuration of the present disclosure. For example, some of components in one modified example may be separated and arbitrarily extracted from the other components of the modified example and may be applied to another embodiment or another modified example.

The invention claimed is:

1. A toroidal continuously variable transmission comprising:
   an input disc including a speed change surface;
   an output disc including a speed change surface;
   a power roller located between the speed change surface of the input disc and the speed change surface of the output disc so as to be tiltable;
   at least one containment body covering a target disc that is at least one of the input disc and the output disc; and
   a housing that houses the input disc, the output disc, the power roller, and the containment body, wherein:
   the containment body includes a ring that covers an outer peripheral surface of the target disc so as to be spaced apart from the outer peripheral surface of the target disc in a radial direction;
   a maximum dimension of the ring in an axial direction is larger than a maximum dimension of the outer peripheral surface of the target disc in the axial direction;
   the power roller is located in a predetermined phase region around the axial direction;
   the ring includes
     a first section corresponding to the phase region of the power roller around the axial direction; and
     a second section that is a phase region around the axial direction other than the first section, the second section corresponding to no power roller;
   the containment body further includes a guard located at one side of the ring which is close to the power roller in the axial direction; and
   the guard is located at the second section of the ring, wherein:
the at least one containment body comprises
a first containment body covering the input disc and
a second containment body covering the output disc; and
the first containment body and the second containment body are connected to each other by a coupling body.

2. A toroidal continuously variable transmission comprising:
an input disc including a speed change surface;
an output disc including a speed change surface;
a power roller located between the speed change surface of the input disc and the speed change surface of the output disc so as to be tiltable;
at least one containment body covering a target disc that is at least one of the input disc and the output disc;
a housing that houses the input disc, the output disc, the power roller, and the containment body; and
a supporting body connected to the housing, wherein:
the containment body includes a ring that covers an outer peripheral surface of the target disc so as to be spaced apart from the outer peripheral surface of the target disc in a radial direction; the supporting body includes an actuator body supporting an actuator that tilts the power roller; and
the containment body is connected to the housing through the actuator body.

3. A toroidal continuously variable transmission comprising:
an input disc including a speed change surface;
an output disc including a speed change surface;
a power roller located between the speed change surface of the input disc and the speed change surface of the output disc so as to be tiltable;
at least one containment body covering a target disc that is at least one of the input disc and the output disc;
a housing that houses the input disc, the output disc, the power roller, and the containment body; and
a joint that connects the containment body to the housing, wherein:
the containment body includes a ring that covers an outer peripheral surface of the target disc so as to be spaced apart from the outer peripheral surface of the target disc in a radial direction; and
the joint includes an absorber that allows the containment body to be displaced.

* * * * *